United States Patent
Kohno et al.

(10) Patent No.: US 10,209,608 B2
(45) Date of Patent: Feb. 19, 2019

(54) LIQUID CRYSTAL PROJECTOR APPARATUS

(71) Applicant: JVC KENWOOD Corporation, Yokohama-shi, Kangawa (JP)

(72) Inventors: Toshiro Kohno, Yokohama (JP); Mitsuharu Fukuda, Yokohama (JP); Yoji Motomiya, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 2 days.

(21) Appl. No.: 15/622,432

(22) Filed: Jun. 14, 2017

(65) Prior Publication Data

US 2018/0088450 A1 Mar. 29, 2018

(30) Foreign Application Priority Data

Sep. 23, 2016 (JP) .................................. 2016-185398
Sep. 23, 2016 (JP) .................................. 2016-185459

(51) Int. Cl.
*G03B 21/16* (2006.01)
*G03B 21/00* (2006.01)
*G03B 33/12* (2006.01)

(52) U.S. Cl.
CPC ........... *G03B 21/16* (2013.01); *G03B 21/006* (2013.01); *G03B 33/12* (2013.01)

(58) Field of Classification Search
CPC ....... G03B 21/16; G03B 21/006; G03B 33/12
USPC ........................................................ 353/58
See application file for complete search history.

(56) References Cited

U.S. PATENT DOCUMENTS 6,736,513 B2 * 5/2004 Koyama .............. H04N 9/3105
                                                              348/E5.143
2002/0158825 A1 * 10/2002 Endo ..................... G09G 3/002
                                                              345/87

FOREIGN PATENT DOCUMENTS

JP        406194621 A  *  7/1994  ............... G02F 1/13
JP        5388394 B2     1/2014

OTHER PUBLICATIONS

Machine Translation of JP 406194621A.*

* cited by examiner

*Primary Examiner* — Steven H Whitesell Gordon
*Assistant Examiner* — Jerry Brooks
(74) *Attorney, Agent, or Firm* — Nath, Goldberg & Meyer; Jerald L. Meyer; Stanley N. Protigal

(57) ABSTRACT

A liquid crystal projector apparatus includes: a plurality of display elements configured to individually modulate light of color components different from one another; and a controller configured to control the individual temperatures of the plurality of display elements. When the temperature of the display element in which a temperature rise rate is slowest among the plurality of display elements does not reach a predetermined temperature, the controller controls so that the temperatures of other display elements stay within a predetermined range that takes as a reference the temperature of the display element in which the temperature rise rate is slowest.

6 Claims, 3 Drawing Sheets

LIQUID CRYSTAL PROJECTOR APPARATUS

CROSS REFERENCE TO RELATED APPLICATION

This application is based upon and claims the benefit of priority under 35 U.S.C. § 119 from Japanese Patent Applications No. 2016-185398 filed on Sep. 23, 2016, and No. 2016-185459 filed on Sep. 23, 2016, the entire contents of both of which are incorporated herein by reference.

BACKGROUND

The present disclosure relates to a liquid crystal projector apparatus using a liquid crystal display element.

Typically, a liquid crystal projector apparatus that displays a color image reflects light, which is emitted from a light source, onto three liquid crystal display elements (hereinafter simply referred to as "display elements") individually provided for red (R), green (G), and blue (B) as primary color components, or transmits the light therethrough, thereby projecting an image onto a screen by using a lens.

While the liquid crystal projector apparatus is in use, the temperature of each display element rises due to heat generated by a drive circuit or heat generated by light emitted from a light source; however, since characteristics of the reflection or transmission of the light vary depending on the temperature, it is necessary to perform temperature control for the display elements in order to keep such a projection image at a high quality. In the temperature control for the display elements, it is important to maintain a temperature balance between the respective display elements simultaneously by controlling the temperature of the respective display elements within a predetermined temperature range. Japanese Patent No. 5308394 discloses a liquid crystal projector apparatus, which controls the temperature of the respective display elements in such a manner that a temperature sensor and a cooling fan are installed for the respective display elements in order to control the temperature of the display elements more accurately.

A first aspect of the embodiments provides a liquid crystal projector apparatus including: a plurality of display elements configured to individually modulate light of color components different from one another; a plurality of temperature detection units configured to individually detect temperatures of the plurality of display elements; a plurality of cooling units configured to individually cool the plurality of display elements; and a controller configured to control the individual temperatures of the plurality of display elements by individually cooling the plurality of display elements by the plurality of cooling units in response to detection results of the plurality of temperature detection units, wherein when the temperature of the display element in which a temperature rise rate is the slowest among the plurality of display elements does not reach a predetermined temperature, the controller controls so that the temperatures of other display elements stay within a predetermined range that takes as a reference the temperature of the display element in which the temperature rise rate is slowest.

A second aspect of the embodiments provides a liquid crystal projector apparatus including: a plurality of display elements configured to individually modulate light of color components different from one another; a plurality of temperature detection units configured to individually detect temperatures of the plurality of display elements; a plurality of cooling units configured to individually cool the plurality of display elements; and a controller configured to control the individual temperatures of the plurality of display elements by individually cooling the plurality of display elements by the plurality of cooling units in response to detection results of the plurality of temperature detection units, wherein the controller controls so that the plurality of display elements individually stay within a predetermined temperature range, and when the temperature of at least one display element among the plurality of display elements becomes a temperature lower than a lower limit of the predetermined temperature range, controls so that the temperatures of other display elements stay within a predetermined range that takes as a reference the temperature of the display element in which the temperature is lowest.

A third aspect of the embodiments provides a liquid crystal projector apparatus including: a plurality of display elements configured to individually modulate light of color components different from one another; a plurality of temperature detection units configured to individually detect temperatures of the plurality of display elements; a plurality of cooling units configured to individually cool the plurality of display elements; and a controller configured to control the individual temperatures of the plurality of display elements by individually cooling the plurality of display elements by the plurality of cooling units in response to detection results of the plurality of temperature detection units, wherein the controller controls so that the plurality of display elements individually stay within a predetermined temperature range, and when the temperature of at least one display element among the plurality of display elements becomes a temperature higher than an upper limit of the predetermined temperature range, controls so that the temperatures of other display elements stay within a predetermined range that takes as a reference the temperature of the display element in which the temperature is highest.

SUMMARY

Immediately after the power of such a liquid crystal display device is turned on, or when the ambient temperature is extremely high or extremely low, then in some cases, all of the display elements cannot be controlled within a target temperature range. For example, when one of the three display elements deviates from the target temperature range, there is a possibility that the color balance between the elements may be lost since it becomes impossible to maintain the temperature balance therebetween, resulting in an impossibility to maintain the assumed quality of a projected image.

BRIEF DESCRIPTION OF THE DRAWINGS

FIG. 3 is a graph showing temperature changes of respective display elements immediately after power of the liquid crystal projector apparatus according to the embodiment is turned on.

DETAILED DESCRIPTION

Figure 1:
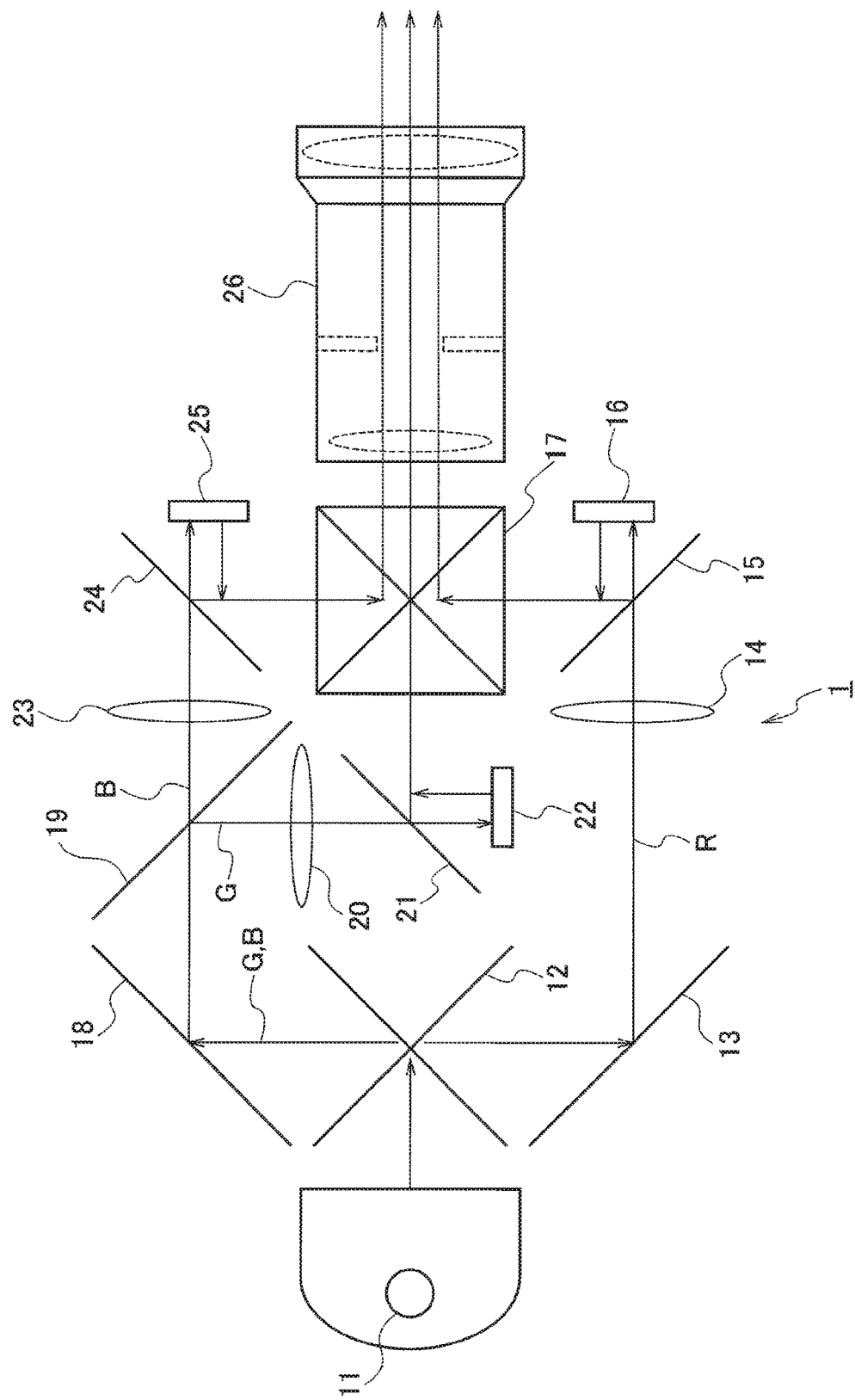
FIG. 1 is an overall view showing a configuration of a liquid crystal projector apparatus according to at least one embodiment.

Hereinafter, a description will be made of liquid crystal projector apparatuses according to respective embodiments with reference to the accompanying drawings. The respective embodiments will be described while taking a reflective-type liquid crystal projector apparatus that reflects light as an example, which is emitted from a light source to three display elements (an Rch display element, a Bch display element, a Gch display element) provided for red (R), green (G), and blue (B) which are primary color components, respectively, and projects an image onto a screen by using a lens.

[Configuration of Liquid Crystal Projector Apparatus]

A description will be made of a liquid crystal projector apparatuses for use in respective embodiments. A liquid crystal projector apparatus 1 includes a light source 11 which emits white light from such as a high-pressure mercury lamp or a metal halide lamp. The light emitted from the light source 11 is incident onto a cross dichroic mirror 12.

The cross dichroic mirror 12 separates three primary colors of such an illumination light, which is incident thereunto, into a R (red component) a G (green) component, and a B (blue) component. The R component light, which has passed through the cross dichroic mirror 12, passes through a mirror 13 and a relay lens 14, is transmitted through a polarization beam splitter 15 that serves as a polarization separation element, and is incident onto an Rch modulation unit 16. The Rch modulation unit 16 polarizes, modulates, and reflects the R component light, which is incident thereonto, in response to a red component of a display image. The reflected light, which is thus polarized and modulated, is reflected on the polarization beam splitter 15, and is incident onto a color combining prism 17 from one side surface portion thereof.

Meanwhile, G component light and B component light, which have passed through the cross dichroic mirror 12, are incident onto a dichroic mirror 19 via a mirror 18. The dichroic mirror 19 separates the G component light and the B component light, which are incident thereonto, into G component light and B component light. The G component light, which is reflected on the dichroic mirror 19, passes through a relay lens 20, is transmitted through a polarization beam splitter 21 that serves as a polarization separation element, and is incident onto a Gch modulation unit 22. The Gch modulation unit 22 polarizes, modulates, and reflects the G component light, which is made incident thereonto, in response to a green component of the display image. The reflected light, which is thus polarized and modulated, is reflected on the polarization beam splitter 21, and is incident onto the color combining prism 17 from a rear surface portion thereof.

Next, the B component light, which is transmitted through the dichroic mirror 19, passes through a relay lens 23, is transmitted through a polarization beam splitter 24 that serves as a polarization separation element, and is incident onto a Bch modulation unit 25. The Bch modulation unit 25 polarizes, modulates, and reflects the B component light, which is incident thereonto, in response to a blue component of the display image. The reflected light, which is thus polarized and modulated, is reflected on the polarization beam splitter 24, and is incident onto the color combining prism 17 from the other side surface portion thereof.

The color combining prism 17 combines the R component light incident from the one side surface portion, the G component light incident from the rear surface portion, and the B component light incident from the opposite side surface portion, and emits the combined light from a front surface portion thereof. The illumination light emitted from the color combining prism 17 is incident onto a projection lens 26 that serves as a projection optical system. This projection lens 26 projects the illumination light, which is incident thereonto, toward a screen (not shown), forms an image thereon, and displays an image thereon.

Figure 2:
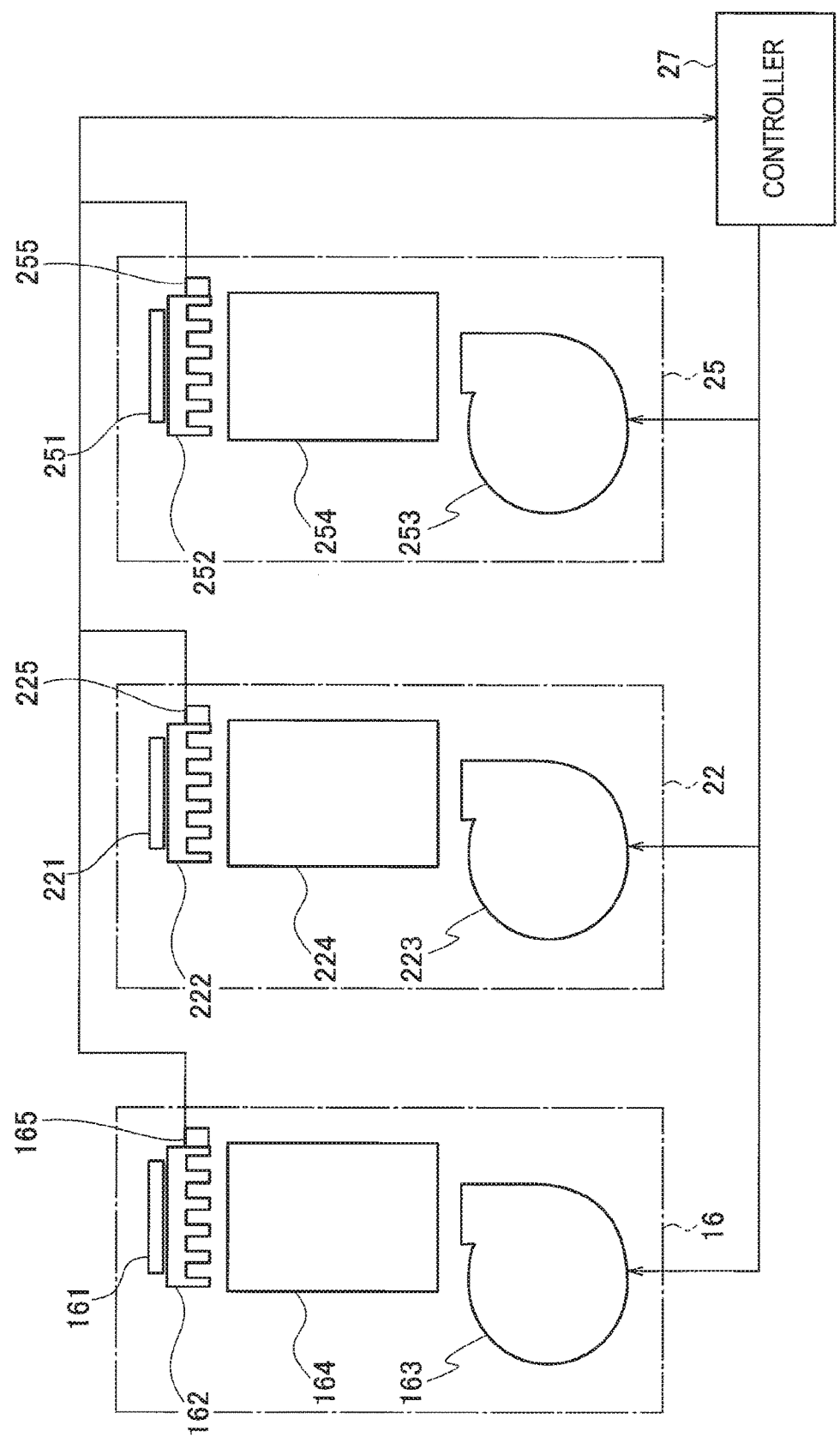
FIG. 2 is a schematic diagram showing configurations of respective modulation units and fan control devices in the liquid crystal projector apparatus according to the embodiment.

Detailed configurations of the Rch modulation unit 16, the Gch modulation unit 22, and the Bch modulation unit 25 will be described with reference to the schematic diagram of FIG. 2. The Rch modulation unit 16 includes: an Rch display element 161 that modulates an R signal component; an Rch heat sink 162 that dissipates the heat of the Rch display element 161; an Rch fan 163 for cooling the Rch display element 161 and the Rch heat sink 162; an Rch duct 164 for blowing air, which is generated by the operation of the Rch fan 163, into the Rch display element 161 and the Rch heat sink 162; and an Rch temperature sensor 165 that detects the temperature of the Rch display element 161. The Rch fan 163 functions as a cooling unit for the Rch display element 161.

The Gch modulation unit 22 includes: a Gch display element 221 that modulates a G signal component; a Gch heat sink 222 that dissipates heat of the Gch display element 221; a Gch fan 223 for cooling the Gch display element 221 and the Gch heat sink 222; a Gch duct 224 for blowing air, which is generated by the operation of the Gch fan 223, into the Gch display element 221 and the Gch heat sink 222; and a Gch temperature sensor 225 that detects the temperature of the Gch display element 221. The Gch fan 223 functions as a cooling unit for the Gch display element 221.

The Bch modulation unit 25 includes: a Bch display element 251 that modulates a B signal component; a Bch heat sink 252 that dissipates heat of the Bch display element 251; a Bch fan 253 for cooling the Bch display element 251 and the Bch heat sink 252; a Bch duct 254 for blowing air, which is generated by the operation of the Bch fan 253, into the Bch display element 251 and the Bch heat sink 252; and a Bch temperature sensor 255 that detects the temperature of the Bch display element 251. The Bch fan 253 functions as a cooling unit for the Bch display element 251.

Each of the Rch fan 163, the Gch fan 223, and the Bch fan 253 is composed of a sirocco fan, an axial fan, or the like. Moreover, each of the Rch temperature sensor 165, the Gch temperature sensor 225, and the Bch temperature sensor 255 is composed, for example, of a thermistor.

Moreover, in the liquid crystal projector apparatus 1, there is installed a controller 27 that controls the number of rotations of each of the Rch fan 163, the Gch fan 223, and the Bch fan 253. Based on each of the temperatures detected by the temperature sensors 165, 225, and 255, the controller 27 controls the number of rotations of each of the fans 163, 223, and 253 so that each of the display elements 161, 221, and 251 can have a desired temperature.

First Embodiment

Figure 3:
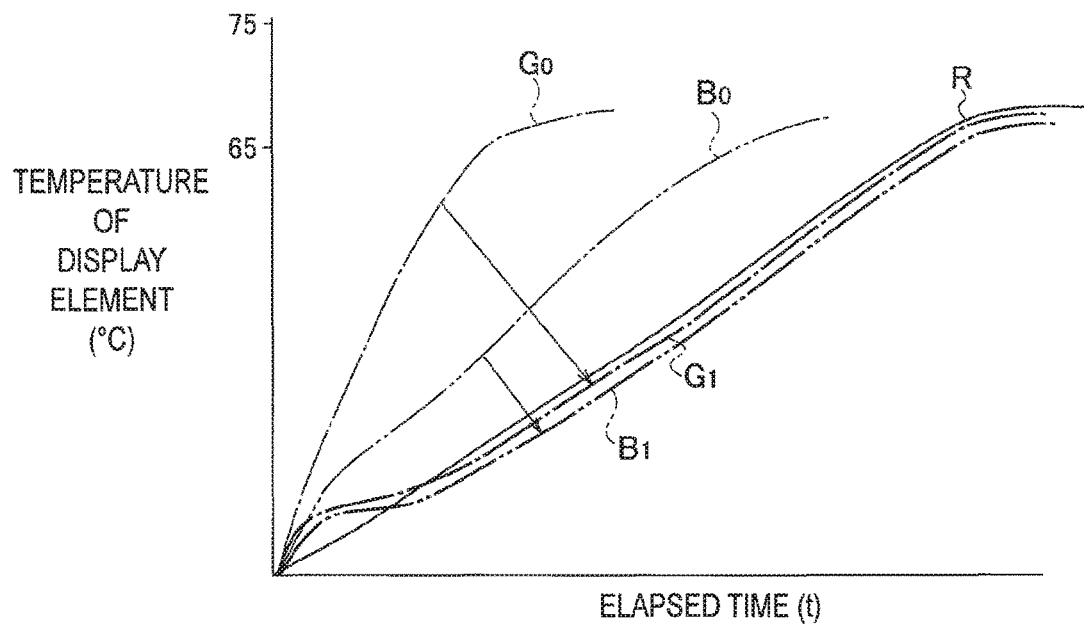

A temperature control operation of each of the display elements 161, 221, and 251 in the liquid crystal projector apparatus 1 according to the first embodiment will be described with reference to FIG. 3. FIG. 3 is a graph showing a temperature change of each of the display elements immediately after the power of the liquid crystal projector apparatus 1 is turned on.

When the temperature of each of the display elements is lower than the first set temperature when the power of the liquid crystal projector apparatus 1 is turned on, the controller 27 performs control so as to raise the temperature of the display element, and accordingly, stops the fan. The first temperature is, for example, 60° C. Each of the display elements generates heat due to heat generated by a drive circuit of the display element itself or light incident from the light source 11, and the temperature thereof rises. At this time, the temperature rise rate is different between the respective display elements in some cases. This is due to the fact that a magnitude of energy of the light irradiated to the display element varies depending on each color component light. The magnitude of the energy of each color component light varies depending on characteristics of the light source 11; however, usually, the energy of the G component light is largest. Therefore, the temperature rise rate of the Gch display element 221 is increased with respect to those of the Rch display element 161 and the Bch display element 251.

For example, as shown in FIG. 3, while the temperature of the Gch display element 221 rises as indicated by a thin single dashed line $G_0$, the temperature of the Bch display element 251 rises at a slow rate as indicated by a thin double dashed line $B_0$, and the temperature of the Rch display element 161 rises at a slower rate as indicated by a solid line R. Therefore, the temperature difference between the Rch display element 161, the Gch display element 221, and the Bch display element 251 is increased, and an appropriate temperature balance between the display elements cannot be maintained, whereby there is an increase in such a possibility that a color balance therebetween may be lost to deteriorated quality of the projected image.

Accordingly, among the three display elements, when the temperature of the Rch display element 251 in which the temperature rise rate is the slowest is lower than the first set temperature, the controller 27 drives and controls the Gch fan 223 and the Bch fan 253 so that the temperature of the Gch display element 221 and the temperature of the Bch display element 251 can stay within a predetermined range set by taking the temperature of the Rch display element 161 as a reference. The predetermined range is, for example, within ±5° C., and the temperature of the Gch display element 221 is controlled to stay within ±5° C. with respect to the temperature of the Rch display element 161, and in a similar way, the temperature of the Bch display element 251 is controlled to stay within ±5° C. with respect to the temperature of the Rch display element 161.

Such control as described above is performed, whereby, as shown in FIG. 3, the temperature of the Gch display element 221 becomes like a bold single dashed line $G_1$, and in comparison with the case ($G_0$) when the Gch fan 223 is not driven, the temperature of the Gch display element 221 approaches the solid line R that indicates the temperature rise of the Rch display element 161. Moreover, the temperature of the Bch display element 251 becomes like a bold double dashed line $B_1$, and in comparison with the case ($B_0$) when the Bch fan 253 is not driven, it approaches the solid line R that indicates the temperature rise of the Rch display element 161. Therefore, even when such temperatures of the respective display elements immediately after the power is turned on are prone to vary therebetween, the temperature difference between the display elements is reduced, and the temperature balance between the respective display elements is maintained at an early stage, whereby the quality of the projected image can be enhanced.

Thereafter, when the temperature of the Rch display element 161 becomes higher than the first set temperature, the controller 27 performs control so that the temperature of each of the display elements can stay within a predetermined temperature range. The predetermined temperature range is, for example, within a range of 60° C. to 70° C.

The present embodiment has been described on the assumption that the temperature rise rate of the Rch display element 161 after the power is turned on is slower than those of the Gch display element 221 and the Bch display element 251; however, the embodiment is not limited to this, and temperatures of other display elements need only to be controlled by taking the temperature of a display element, in which the temperature rise rate is the slowest, as a reference. For example, when the temperature rise rate of the Gch display element 221 is the slowest, the temperatures of the other display elements are controlled by taking the temperature of the Gch display element 221 as a reference until the temperature of the Gch display element 221 reaches the first set temperature. In a similar way, when the temperature rise rate of the Bch display element 251 is the slowest, the temperatures of the other display elements are controlled by taking the temperature of the Bch display element 251 as a reference until the temperature of the Bch display element 251 reaches the first set temperature. Such differences between the temperature rise rates of the display elements after the power is turned on need only to be confirmed in advance by experiment.

Second Embodiment

The temperature of each of the display elements is controlled in such a manner that the display element is cooled by air blown by the fan; however, when the ambient temperature is extremely high or extremely low on the contrary, then there is the possibility that it may become impossible to control some display elements within the temperature range taken as a target.

Figure 4:
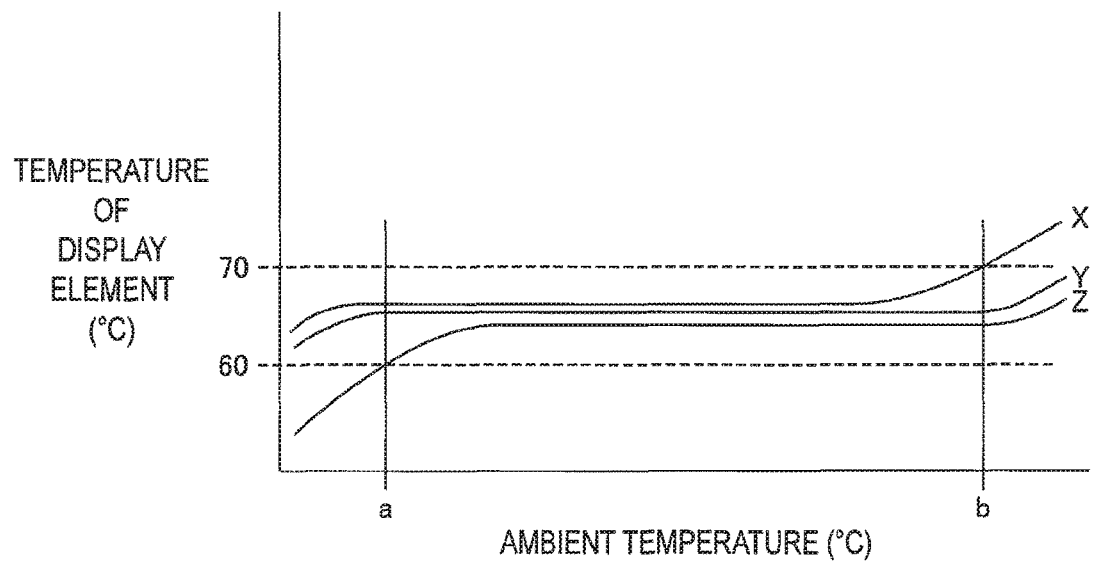
FIG. 4 is a graph showing temperature changes of the respective display elements while the liquid crystal projector apparatus according to the embodiment is in operation.

FIG. 4 is a diagram showing temperature changes of respective display elements when the ambient temperature is changed in a state in which the respective display elements are controlled to individually stay within the target temperature range of 60-70° C.

X, Y, and Z denote display elements of different colors, each of which corresponds to any of the Rch display element 161, the Gch display element 221, and the Bch display element 251. The temperature of the display element Z cannot be maintained within the target temperature range, when the temperature concerned is equal to or lower than the ambient temperature a, drops together with the ambient temperature, and becomes a temperature lower than 60° C. as a lower limit of the target temperature range. Meanwhile, at the ambient temperature a, the display elements X and Y are controllable within the target temperature range. However, if the display elements X and Y are controlled to stay within the target temperature range in the case of the ambient temperature a or lower, then the temperature difference between the display element Z and the display elements X and Y becomes large, and the temperature balance between the display elements cannot be maintained. If the temperature balance between the display elements cannot be maintained, then there is an apprehension that a color balance therebetween may be lost. Therefore, at the ambient temperature a or lower, the temperatures of the display elements X and Y are controlled to stay within a predetermined range that takes, as a reference, the temperature of the display element Z having the lowest temperature. Specifically, the fan for the display element Z is stopped, and the temperatures of the display element X and the display element Y are controlled, for example, within ±5° C. with respect to the temperature of the display element Z.

Moreover, the temperature of the display element X cannot be maintained within the target temperature range when the temperature concerned is equal to or higher than the ambient temperature b, rises together with the ambient temperature, and becomes a temperature higher than 70° C. as an upper limit of the target temperature range. Meanwhile, at the ambient temperature b, the display elements Y and Z are controllable within the target temperature range. However, if the display elements Y and Z are controlled to stay within the target temperature range in the case of the ambient temperature b or higher, then the temperature difference between the display element X and the display elements Y and Z becomes large, and the temperature balance between the display elements cannot be maintained. If the temperature balance between the display elements cannot be maintained, then there is apprehension that the color balance therebetween may be lost. Therefore, at the ambient temperature b or higher, the temperatures of the display elements Y and Z are controlled to stay within a predetermined range that takes, as a reference, the temperature of the display element X having the highest temperature. Specifically, while keeping the number of rotations of the fan for the display element X to the maximum, the temperatures of the display element Y and the display element Z are controlled, for example, within ±5° C. with respect to the temperature of the display element X.

In this way, even when the temperature of at least one of the display elements cannot be maintained within the target temperature range, the temperature difference between the display elements can be reduced, and the collapse of the color balance can be reduced.

When each of the display elements is controllable within the target temperature range, in addition to controlling the temperature of each of the display elements to stay within the predetermined temperature range, such a procedure may be adopted so that while taking the temperature of a predetermined display element as a reference, temperatures of other display elements can be controlled. For example, the temperature of the Gch display element 221, which is most likely to be affected in image quality, may be controlled to be 60 to 70° C., and the temperatures of the Rch display element 161 and the Bch display element 251 may be controlled to stay within ±5° C. with respect to the temperature of the Gch display element 221. The temperatures of the display elements are controlled as described above, whereby the temperature balance between the respective channels can be controlled more accurately.

As described above, in accordance with the liquid crystal projector apparatuses according to the first and second embodiments, even in an environment where all the display elements cannot be controlled within the predetermined temperature range, the temperatures of the respective display elements can be controlled so that a suitable temperature balance can be maintained between the respective display elements.

The above-mentioned first and second embodiments illustrate an example of performing the control so that the temperatures of the display elements of the respective channels can become as equal as possible to one another; however, such a temperature range as a control target may be changed for each of the display elements. Usually, since the Bch display element reflects light containing a large amount of ultraviolet components, the Bch display element deteriorates faster than the other display elements, and accordingly, the lifetime of the display elements can be extended by cooling the Bch display element to a temperature slightly lower than those of the other display elements. Therefore, the target setting temperature of the Bch display element may be controlled to be slightly lower (for example, approximately 5 C.) than those of the Rch display element and the Gch display element.

Moreover, the foregoing first and second embodiments have been described on the assumption that the cooling unit is configured to blow air by the fan; however, the cooling unit is not limited to such an air-cooling type, and a water-cooling type is also applicable.

Furthermore, the foregoing first and second embodiments have been described on the assumption that the color components are three colors which are red, green, and blue; however, the present invention is not limited to this, and for example, the color components may also be four colors by adding yellow.

What is claimed is:

1. A liquid crystal projector apparatus comprising:
a plurality of display elements configured to individually modulate light of color components different from one another;
a plurality of temperature detection units configured to individually detect temperatures of the plurality of display elements;
a plurality of cooling units configured to individually cool the plurality of display elements; and
a controller configured to control the individual temperatures of the plurality of display elements by individually cooling the plurality of display elements by the plurality of cooling units in response to detection results of the plurality of temperature detection units, wherein
when the temperature of the display element in which a temperature rise rate is the slowest among the plurality of display elements does not reach a predetermined temperature, the controller controls so that the temperatures of other display elements stay within a predetermined range that takes as a reference the temperature of the display element in which the temperature rise rate is slowest.

2. The liquid crystal projector apparatus according to claim 1, wherein the cooling units are blower fans, and the controller controls a number of rotations of each of the blower fans based on each of the detection results of the temperature detection units.

3. A liquid crystal projector apparatus comprising:
a plurality of display elements configured to individually modulate light of color components different from one another;
a plurality of temperature detection units configured to individually detect temperatures of the plurality of display elements;
a plurality cooling units configured to individually cool the plurality of display elements; and
a controller configured to control the individual temperatures of the plurality display elements by individually cooling the plurality of display elements by the plurality of cooling units in response to detection results of the plurality of temperature detection units, wherein
the controller
controls so that the plurality of display elements individually stay within a predetermined temperature range, and
when the temperature of at least one display element among the plurality of display elements becomes a temperature lower than a lower limit of the predetermined temperature range, controls so that the temperatures of other display elements stay within a predetermined range that takes as a reference the temperature of the display element in which the temperature is lowest.

4. The liquid crystal projector apparatus according to claim 3, wherein the cooling units are blower fans, and the controller controls a number of rotations of each of the lower fans based on each of the detection results of the temperature detection units.

5. A liquid crystal projector apparatus comprising:
a plurality of display elements configured to individually modulate light of color components different from one another;
a plurality of temperature detection units configured to individually detect temperatures of the plurality of display elements;
a plurality of cooling units configured to individually cool the plurality of display elements; and
a controller configured to control the individual temperatures of the plurality of display elements by individually cooling the plurality of display elements by the plurality of cooling units in response to detection results of the plurality of temperature detection units, wherein
the controller
controls so that the plurality of display elements individually stay within a predetermined temperature range, and
when the temperature of at least one display element among the plurality of display elements becomes a temperature higher than an upper limit of the predetermined temperature range, controls so that the temperatures of other display elements stay within a predetermined range that takes as a reference the temperature of the display element in which the temperature is highest.

6. The liquid crystal projector apparatus according to claim 5, wherein the cooling units are blower fans, and the controller controls a number of rotations of each of the blower fans based on each of the detection results of the temperature detection units.

* * * * *

UNITED STATES PATENT AND TRADEMARK OFFICE
CERTIFICATE OF CORRECTION

PATENT NO. : 10,209,608 B2
APPLICATION NO. : 15/622432
DATED : February 19, 2019
INVENTOR(S) : Toshihiro Kohno, Mitsuharu Fukuda and Yoji Motomiya Page 1 of 1

It is certified that error appears in the above-identified patent and that said Letters Patent is hereby corrected as shown below:

On the Title Page

Please delete and replace with following Applicant City:
"(71) Applicant: JVC KENWOOD Corporation, Yokohama-shi, Kanagawa (JP)".

In the Claims

Claim 3, Column 8, Line 53, delete "a plurality cooling units" and replace with "a plurality of cooling units".
Claim 3, Column 8, Line 56, delete "the plurality display elements" and replace with "the plurality of display elements".
Claim 4, Column 9, Line 5, delete the word "lower" and replace with "blower".

Signed and Sealed this
Ninth Day of April, 2019

Andrei Iancu
*Director of the United States Patent and Trademark Office*